Nov. 28, 1961 D. E. ECKDAHL 3,011,152

CHARACTER READING APPARATUS

Filed Dec. 10, 1957 2 Sheets-Sheet 1

INVENTOR:
Donald E. Eckdahl

By Louis A. Kline
John J. Matlago
Attorneys

INVENTOR:
Donald E. Eckdahl
By Louis A. Kline
John J. Matlago
Attorneys.

United States Patent Office 3,011,152

Patented Nov. 28, 1961

3,011,152

CHARACTER READING APPARATUS

Donald E. Eckdahl, Palos Verdes Estates, Calif., assignor to The National Cash Register Company, Dayton, Ohio, a corporation of Maryland Filed Dec. 10, 1957, Ser. No. 701,897
5 Claims. (Cl. 340—149)

This invention relates to character reading apparatus and more particularly to a novel arrangement for sensing magnetic characters printed on a moving medium such as paper tape.

In the data processing field, it is highly desirable to be able to sense characters printed with magnetic ink in legible form, such as characters found on business documents; and to convert the signals so obtained directly to a binary code useful for entry in an electronic digital computer. In order to obtain sufficient information to be able to uniquely define each of the characters of the alphabet, for example, it has previously been proposed to read a character printed in magnetic ink by the utilization of a head with a single gap having a length greater than the height of the character. The reading of a character with such a head results in a linear scan which has the limitation that all the vertical information about the shape of the character is lumped together. Thus when it is desired to be able to distinguish a large number of characters, it is difficult to obtain sufficient distinguishing data about each of the characters by this approach.

One arrangement that has been proposed to preserve the vertical data about the shape of the character is to substitute a large number of closely stacked heads for the one wide head presently employed in the art. However, a stationary multi-channel head of this type is relatively high in cost because of the intricate head structure required in such a closely packed unit when designed to read small print such as standard typewriter-size characters, for example. In addition, the output circuits and the complicated logic associated with such a multi-channel head further add to the cost of such an arrangement.

One of the objects of this invention is to provide a novel reading head arrangement for recognition of characters printed on a paper in magnetic ink.

Another object of this invention is to provide a novel reading head arrangement for direct character recognition which simplifies the registration problem of positioning the print on the reading medium relative to the head.

These and other objects of the invention will be better understood by the following description and the drawings in which.

Figures 1, 2, 3:
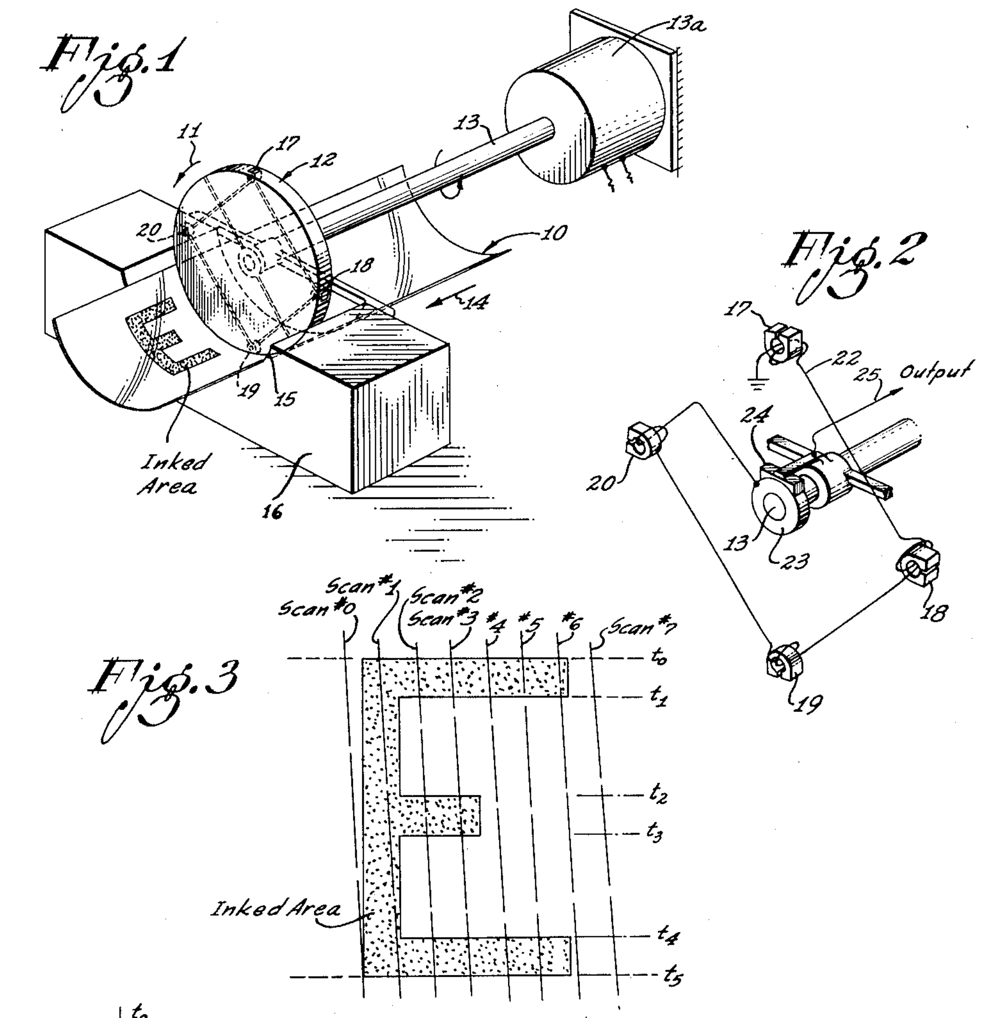
FIG. 1 is a perspective view of the reading apparatus of the present invention.
FIG. 2 is a schematic diagram showing the wiring arrangements of the heads located about the periphery of the rotary mount.
Figure 4:
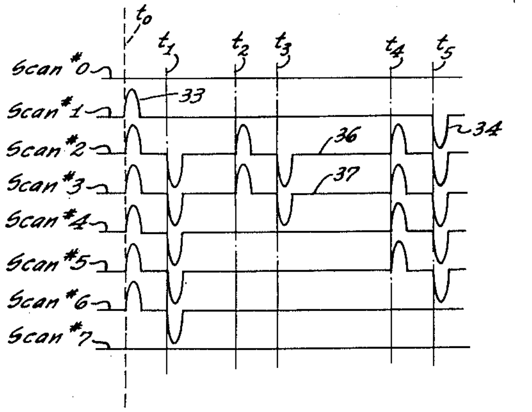
Figures 5, 6:
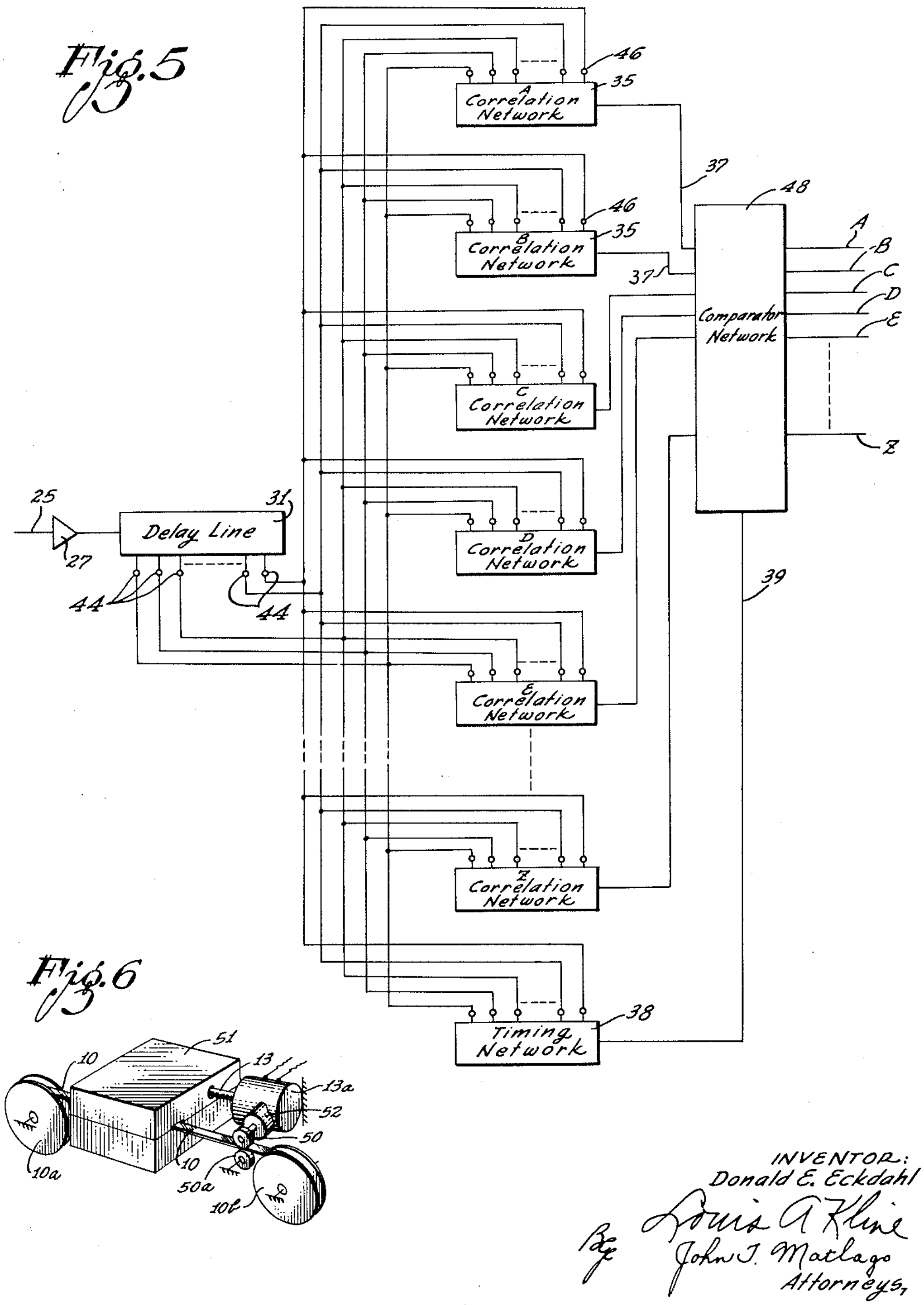

FIG. 3 indicates the path of the heads past the magnetic character while in the process of scanning a character;

FIG. 4 shows graphs indicative of the waveforms generated by the heads on each scan of the character;

FIG. 5 is a block diagram of the means for decoding the signal waveforms generated on reading the characters; and FIG. 6 is a diagrammatic illustration of an arrangement of apparatus for traversing a record medium past a scanning station at a desired speed in a particular direction.

Referring now to the drawings, there is depicted in partly diagrammatic fashion an exemplary illustrative form of apparatus functioning according to the invention. As shown in FIG. 1, a paper tape 10 is shown with characters, such as the character E, formed thereon with magnetic ink which has been magnetized so as to be saturated in a given direction. By means later explained in connection with FIG. 6, the tape 10 is advanced past a disc type head mount 12 which is rotated about an axis generally parallel to the direction of motion of tape 10, by a shaft 13 driven by drive means 13*a*. Thus the mount 12 rotates in the direction indicated by arrow 11, transversely across the tape 10 at a speed proportional to the speed of the tape. For example, the mount may be rotated at approximately 240 r.p.s. as the tape is moved at approximately 15" per sec., in the direction indicated by arrow 14. The tape 10 may be driven by a capstan drive diagrammatically indicated in FIG. 6, as well understood in the art. The tape 10 is guided past the head mount 12 by suitable guide means such as a concave guide 15 provided in a support 16. Guide 15 serves to hold the tape 10 in a curved path conforming to the periphery of head mount 12. In the embodiment of apparatus shown, the head mount 12 has four magnetic pick-up heads 17, 18, 19, and 20 (see FIG. 2) mounted on the outer circumference thereof with their gaps positioned parallel with the axis of the rotation. As shown in FIG. 2, each of the four heads is spaced at substantially 90° from the next about the periphery of the mount 12. A sense lead 22 connects from ground through each of the heads 17, 18, 19, and 20 in series to a slip ring 23 provided on drive shaft 13. The brush 24 riding on the slip ring 23 connects to output lead 25 to which the signals induced in the individual heads scanning the character on the tape 10 are consecutively fed.

It should be understood that the rotary mount 12 of this present invention could utilize other arrangements for interconnecting the heads, such as heads 17, 18, 19, and 20, and for conveying and switching the signals onto the output lead 25. Furthermore, the rotary mount could be provided with only a single head on the periphery thereof. A more detailed description of the head arrangement and mechanical and/or electronic switching systems for eliminating noise and routing signals sensed by the heads onto a single output lead can be obtained from an article by Ray M. Dolby published in the April 1957 issue of the Journal of the SMPTE, volume 66.

As indicated in FIG. 6, tape 10 may be drawn from a roll 10*a* by one or more capstan rolls such as roll 50 and wound onto a receiving roll 10*b*, passing by a scanning location or station in a housing 51 which contains head mount 12 and the tape guiding devices. Shaft 13 is shown driven from a drive means 13*a* which includes an adjustable ratio gear box 52. Gear box 52, as indicated, has an output shaft for driving the tape drawing capstan 50 which cooperates with pinch roll 50*a*, whereby the tape is drawn past the scanning station at a speed adjustably proportional to the scanning speed of head mount 12. In operation of the present invention, as each of the rotating heads, such as head 17, passes over the character, such as the character E, shown, it produces signals indicative of the pattern of the magnetic ink scanned. Due to the high rotary speed of mount 12 relative to the traverse speed of tape 10 past the mount, the heads of the present invention pass over or scan a character a plurality of times, and thereby provide a complete and usable electric wave description of the character. The paths of the heads on successive scans across the magnetic character E are indicated by the scan lines #0 to #7, respectively, in FIG. 3. These parallel scan paths are shown to be at a slight angle with respect to a line perpendicular to the direction of travel of the tape 10. FIG. 4 shows a generally idealized pattern of the waveforms generated on each of the scans #0 to #7 past the character E. Thus, assuming the head 17 sweeps across the tape 10 to form scan #0, no pulses are generated since this scan does not include any of the character E. The next head 18 then comes into position to perform scan #1 in FIG. 3. Thus, as shown in FIG. 4, during scan #1 the head 18 first produces a positive pulse 33 as it passes the top of the character E and produces a negative pulse 34 as it passes the bottom edge thereof. As the mount 12 continues to rotate, heads 19 and 20 successively rotate past tape 10 to perform scans #2 and #3 past the character. Thus heads 19 and 20 produce a series of pulses as shown by waveforms 36 and 37 for scans #2 and #3, respectively. Following the scanning by head 20, the head 17 again passes over the character during scan #4 and the sensing of the character by the successive heads repeats again, providing pulses indicated in the corresponding waveforms of FIG. 4. One of the features of the present invention is that this arrangement for scanning a character with a rotating head dispenses with any need for providing special circuitry for controlling the registration of the print on the tape relative to the rotating path of the heads. This is because the arc described during the complete sweep of a head transversely across the tape is longer than the height of the characters.

It should now be clear that as far as the output lead 25 of the head mount 12 is concerned, a more-or-less continuous waveform of pulses is received from brush 24. As shown in FIG. 5, these pulses are fed into amplifier 27 where, after being amplified, the signals enter delay line 31 which is a lumped constant delay line. The delay provided by line 31 is preferably slightly longer than the time required for a character of maximum length to be completely scanned by the heads. A plurality of taps 44 are provided along the length of the delay line 31. The number of taps 44 provided is such as to assure that the waveform in the delay line at a selected given time and representing one complete character can be completely defined.

From the delay line 31 onward the circuitry is divided into a number of parallel paths equal to that of the number of different characters to be decoded. Thus, as shown in FIG. 5, an individual correlation network, such as network 35, is provided for each of the characters, such as A to Z, which may appear on the tape to be sensed. Taps 44 of delay line 31 are connected in parallel to sets of corresponding taps, such as tap 46, provided for each of the networks 35. Thus all of the networks 35 may simultaneously sense the signals at the taps 44 for the entire waveform constituting the signal obtained by scanning a character. Each of the correlation networks 35 provides correlation voltages characteristic of the signal representing a respective one of the characters, in a manner previously known in the art. Thus each correlation network 35 is designed on the basis of the waveform representing its corresponding character. At the specified time that the waveform from that character is properly stationed within the delay line 31 and presented to all of the correlation networks, the particular correlation network corresponding to the character will, upon comparison, have a higher output than any of the other comparison networks. Stated otherwise, all the other correlation networks 35 will have lower voltage outputs, and recognition of the desired character is based on the network having the maximum voltage signal output. To distinguish between the character path carrying the maximum output and those carrying lesser output, a comparator network 48 is employed. This comparator network 48 compares the voltage signals on the outputs 37 of the several networks 35 to determine which reaches the highest voltage.

In addition to the correlation network outputs applied to comparator 48, there is an additional input which controls the timing of the comparator network 48. This input is provided by a timing network 38 which likewise responds to the signals on the output taps 44 of the delay line 31. This latter network 38 is so arranged that it produces an output at the time when approximately one-third of the scans over a character have entered into the delay line 31. The output of the timing network 38 is then appropriately delayed until the character representing series of electric-pulse signals is properly disposed in the delay line 31 in the relationship for which the correlation networks 35 are designed. At that time instant a pulse is applied on line 39 connected to the comparator network 48 and the signals on each of the character output lines 37 of the networks 35 are compared.

It should be understood that the details of the correlation networks 35 and the comparator network 48 are not per se of the present invention, the block diagram in FIG. 5 being merely shown as one possible circuit arrangement for decoding the signals sensed by scanning the character on the tape with the rotating heads shown in FIG. 1. A more detailed description of correlation networks and associated circuitry which may be utilized to distinguish between the various character-representing signals as sensed from delay device 31 may be obtained from an article by K. R. Eldredge et al., published in the December 10–12, 1956, issue of the Proceedings of the Eastern Joint Computer Conference.

It should be understood that the form and orientation of the character, such as the character E, printed on the paper tape 12 as shown in FIG. 1, is for illustrative purposes only and that the magnetic print on the paper can assume other shapes, sizes and orientations relative to the axis of rotation of the rotating heads, for example, and still fairly fall within the scope of the present invention.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. Apparatus for translating informational characters printed with magnetic ink on a non-magnetic record medium, into respective corresponding sets of electric pulse output signals, comprising: a movable mount having magnetic pick-up head means thereon arranged for successive traverses along a sensing path; a non-magnetic record medium having thereon legible magnetized alphanumeric characters formed of magnetic ink; means for moving said mount to cause the pick-up head means to rapidly perform successive traverses along its sensing path; and means for guiding and moving said medium substantially transversely of said path to move said characters successively past and in close adjacency to said path at a rate such that each character has adjacent portions thereof traversed or scanned in succession by said head means whereby there is induced in said head means a unique set of time-spaced electric pulse output signals for each informationally different one of the characters moved past said path.

2. Apparatus according to claim 1, including output lines each of which is assigned to receive and transfer only those translated output signals representative of a single respective one of the characters on the said record medium; and including means for selecting from successive sets of electric pulse signals those sets of signals corresponding to any specific one of said characters and for translating those selected sets to provide respective translated output signals for transmission on the respective assigned one of said output lines.

3. Apparatus for producing a distinctive character-representing electric pulse train representing a legible magnetic alphanumeric character printed upon a non-magnetic record medium, said apparatus comprising: a non-magnetic record medium bearing legible magnetized magnetic informational characters printed thereon; means including movable magnetic pick-up head means and means for periodically moving the head means through a pick-up path which path is at least as long as the maximum height of one of said characters; means for guiding and moving said record medium to traverse said characters transversely past said path and in inductive proximity thereto and at a rate such that small portions of each said character are in succession passed by said head means transversely of the direction of movement of the said medium while the respective character is traversing past said path, whereby as said head means passes into the magnetic field produced by an adjacent small portion of a character an electric-pulse signal of a first polarity is produced and as the head means passes out of the said magnetic field produced by the said adjacent small portion of the said character an electric-pulse signal of a second polarity is produced and whereby the successive traverses of said means past the said portions of the said character there is produced by the said means a series of time-spaced electric-pulse signals the number and time-spacing of which uniquely represent the said character; and signal translating means connected to receive the produced electric pulse signals.

4. Translating apparatus comprising, in combination: an elongate flexible non-magnetic tape and at least one printed alphanumeric character composed essentially of magnetized magnetic material imprinted upon the tape; first means, including tape-driving means and tape-guiding means, constructed and arranged to move said tape longitudinally at a determined velocity in a first direction past a scanning zone which is of arcuate configuration transversely of the direction of movement of the tape, said tape-guiding means being constructed and arranged to guide said tape through a tape path in which is included said scanning zone; second means, including electromagnetic transducer means and transducer-driving means, said transducer means comprising transducer head means constructed and arranged to produce an electric pulse signal of a first polarity in response to any movement of the head means toward and into adjacency to a portion of said character and to produce an electric pulse signal of a second polarity in response to movement of the head means away from adjacency to a portion of said character, and said transducer-driving means being constructed and arranged to repetitively move said transducer head means along an arcuate scanning path at said scanning zone and closely adjacent said tape path and a plurality of times during movement of said magnetized magnetic character past said scanning zone, to thereby produce in said transducer head means a series of electric pulse output signals uniquely time-spaced to thereby be uniquely definitive of the particular alphanumeric character thus scanned; third means, including means interconnecting said driving means and said transducer-driving means, constructed and arranged to correlate the velocity of said tape and the repetitive movements of said transducer head means along said arcuate scanning path; and fourth means, including a plurality of alphanumeric signal lines each for and assigned to a respective one of a set of alphanumeric characters, and electric pulse signal translating means, connected to said second means and constructed and arranged to operate in response to said series of electric pulse output signals to produce upon only the alphanumeric signal line corresponding to said printed character a signal representing said character.

5. The method of producing a set of electric-pulse signals which uniquely characterizes a particular magnetic printed alphanumeric character with respect to other magnetic printed characters, said method comprising: moving a particular legible magnetized magnetic printed character at a determined velocity in a first direction past and in close proximity to a transducing path extending transversely of the said first direction; rapidly sensing the changes in the magnetic field closely adjacent to boundaries of the particular character extending in the general direction of movement of the particular character by rapidly executing a plurality of successive sensing motions in said path in a direction transverse to the direction of movement of the particular character during movement of the particular character past the transducing path; during and in response to each sensing of a change in the magnetic field closely adjacent to a boundary of the particular character extending in the general direction of movement of the particular character, producing a respective electric-pulse signal, whereby during the time of movement of the particular character past the transducing path there are produced electric-pulse signals which are time-spaced and composed in a set of time-spaced electric-pulse signals the time-spacing of which is uniquely characteristic of the particular legible magnetized magnetic printed alphanumeric character moved past the transducing path.

References Cited in the file of this patent

UNITED STATES PATENTS

| | | |
|---|---|---|
| 2,170,751 | Gabrilovitch | Aug. 22, 1939 |
| 2,245,286 | Marzocchi | June 10, 1944 |
| 2,352,023 | Schuller | June 20, 1944 |
| 2,528,699 | Masterson | Nov. 7, 1950 |
| 2,539,837 | Howell | Jan. 30, 1951 |
| 2,616,983 | Zworykin | Nov. 4, 1952 |
| 2,773,120 | Masterson | Dec. 4, 1956 |
| 2,813,924 | Coutant | Nov. 19, 1957 |
| 2,829,208 | Dawkins | Apr. 1, 1958 |
| 2,845,495 | Lyon | July 29, 1958 |
| 2,866,012 | Ginsburg | Dec. 23, 1958 |
| 2,897,267 | Prince | July 28, 1959 |
| 2,903,521 | Ellison | Sept. 8, 1959 |
| 2,909,616 | Marty | Oct. 20, 1959 |

FOREIGN PATENTS

| | | |
|---|---|---|
| 785,853 | Great Britain | Nov. 6, 1957 |

OTHER REFERENCES

"Rotary Head Switching in the Ampex Video Tape Recorder" by Dolby, Journal of the SMPTE, vol. 66, Number 4, April 1957, pp. 184–188.

"Stanford Research Institute News Bulletin," vol. 7, No. 9, October 1955, pp. 1 to 12.

"Teaching Machines to Read," by Eldredge, Kamphoefner and Wendt, "Stanford Research Institute Journal." First Quarter 1957, pp. 18 to 23.